Feb. 23, 1926.                                                 1,574,513
                    D. S. RATLIFF ET AL
                       VEHICLE SIGNAL
                    Filed Sept. 12, 1921
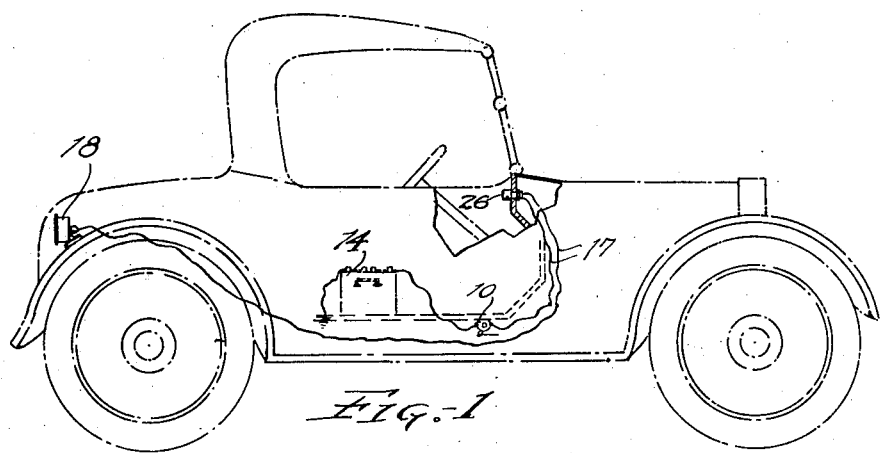
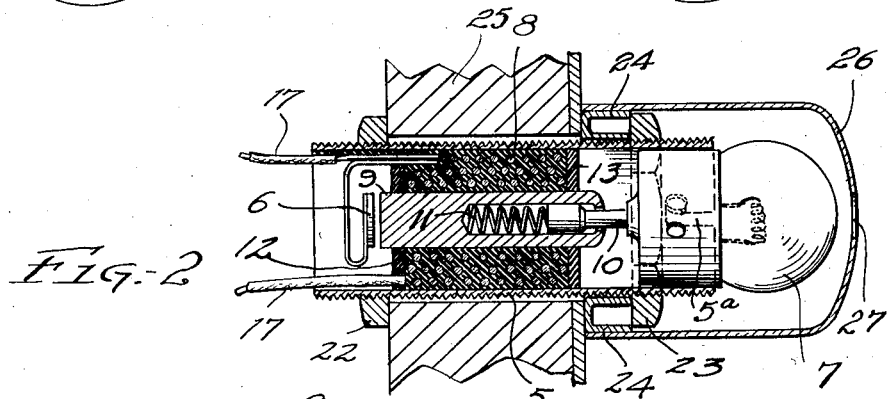
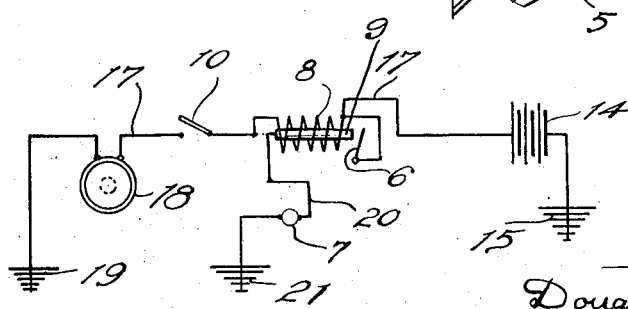

Patented Feb. 23, 1926.

1,574,513

UNITED STATES PATENT OFFICE.

DOUGLAS S. RATLIFF, OF CLEVELAND HEIGHTS, JOHN M. FRANCIS, OF LAKEWOOD, AND THOMAS E. REESE, OF CLEVELAND, OHIO.

VEHICLE SIGNAL.

Application filed September 12, 1921. Serial No. 499,984.

*To all whom it may concern:*

Be it known that we, DOUGLAS S. RATLIFF, JOHN M. FRANCIS, and THOMAS E. REESE, citizens of the United States, residing at Cleveland Heights, Ohio, Lakewood, Ohio, and Cleveland, Ohio, respectively, all in the county of Cuyahoga and State of Ohio, have invented certain new and useful Improvements in a Vehicle Signal, of which the following is a full, clear, and exact description, reference being had to the accompanying drawings.

This invention relates to vehicle signal systems and is particularly concerned with that class of electric signals wherein there is a signal light mounted on the rear of the vehicle.

The general object of our invention is the provision of a simple, durable and efficient system wherein there is a rear signal light and also an auxiliary light located on the instrument board which will at all times effectively indicate when the rear light is operating.

A more specific object of the present invention is the provision of a compact dashboard light mechanism having a lamp socket of the bayonet lock type which may also contain a coil connected in series with the tail light circuit; the coil serving as a solenoid to set up a flux which will close a switch and connect the dashboard light circuit to the battery. The coil may have sufficient turns to obtain a proper flux density to maintain the switch closed during the period the rear signal light is on but should be of small resistance so as not to unduly obstruct the flow of current through the rear light circuit.

Other objects will become apparent from the following description hereinafter set forth in reference to the accompanying drawings which illustrate a preferred embodiment of our invention. The essential characteristics will be summarized in the claims.

In the drawings, Fig. 1 is a side elevation of an automobile showing the relative positions of the signal light, battery and instrument board light; Fig. 2 is an enlarged cross sectional view taken through the instrument board light mechanism; Fig. 3 is a diagram illustrating the method of connecting both lights to the battery.

A number of automobile signaling systems have been devised for indicating the operating intentions of the driver including tail lights which are controlled through a switch operated from the brake pedal or clutch pedal. Such mechanism frequently becomes inoperative unbeknown to the driver and a common expedient has been to connect a small candle power lamp, which was visible from the driver's position, in series with the tail light. This arrangement has proved to be unsatisfactory due to the fact that such a light will glow with very small amperage while the tail light must necessarily have a higher amperage to be visible from any appreciable distance.

To insure the proper working of the system, we have provided an instrument board light with a separate circuit and have arranged a solenoid in the rear light circuit which is adapted to control the flow of current in the front light circuit. To positively insure a proper indication of the operating condition of the rear light, we have arranged a simple magnetic switch mechanism comprised of a threaded sleeve 5 having slots 5ª constituting the usual bayonet lock for the retention of an instrument board lamp 7. The sleeve is also arranged to contain a small, compact solenoid 8 having a suitable iron core 9 which also serves as a conductor in the circuit of the lamp 7. The core may contain a plunger 10 maintained in electrical contact with the end of the lamp 7 by a spring member 11 positioned in the core. A magnetic switch contact 6 is positioned adjacent the inner end of the core and may be connected to one of the lead wires of the coil. End members 12 and 13 are comprised of suitable insulating material of sufficient thickness to permit a rigid positioning of the coil within the sleeve when the solenoid is forced therein.

In the diagram a one-wire system is shown as comprising a battery 14 having one terminal grounded at 15, a switch 10 interposed in the rear light circuit 17 and operable in the usual manner by a brake or clutch pedal, a rear signal light 18 and a solenoid coil 8 connected in series between the battery 14 and the tail light 18. A suitable ground connection 19 completes the rear light circuit. As the current flows through the rear light circuit, flux will be set up in the core 9 and the magnetic switch 6 will connect the front light to the rear light circuit. The front light circuit may have a suitable ground connection, as indicated at 21.

It is obvious that the front lamp 7 will not glow unless the switch 6 is closed and as the closing of the switch is made contingent upon the presence of a sufficient flux in the core 9, the light 7 will not operate unless a full current is flowing in the rear light circuit to light the rear lamp. If, for any reason, the tail light does not operate, current will not flow through the coil and consequently, the switch 6 will remain open and the front light 7 will not operate. Thus, it is to be seen that we have provided a positive means for indicating to the driver when the tail light is not properly operating.

As it is desirable that the front light mechanism be applicable to any style or make of automobile, we have provided suitable adjusting nuts 22 and 23 on the opposite ends of the threaded sleeve 5. A ring 24 may serve as a spacing member between the nut 23 and the instrument board 25 and also as a supporting means upon which a lamp hood 26 may be slidably positioned. The hood may have an opening 27 of sufficient size to permit visibility of the lamp filament, but small enough to prevent the escape of any appreciable volume of light rays which would annoy the driver.

From the foregoing description of our invention, it is apparent that we have provided a novel front signal light in an automobile signaling system which will properly function under all circumstances to indicate the operative or inoperative condition of the rear signal light. Likewise, it is evident that we have embodied the invention in a design of extreme simplicity with a minimum number of simple elements of such character that a high degree of economy may be obtained in the production thereof.

Having thus described our invention, we claim:—

1. In a vehicle signaling system, a signal light comprising a sleeve, means for securing the sleeve to the dashboard of a vehicle, a signal lamp positioned in one end of the sleeve, a solenoid contained by the sleeve, a magnetic switch adapted to contact with the core of said solenoid, and a plunger positioned in said core in yieldable contact with said lamp, and means supported by the sleeve for shielding the major portion of the lamp rays from the operator's vision.

2. In a vehicle signaling system, a signal light comprising an adjustable sleeve provided with means to secure it to the dashboard of the vehicle, a solenoid rigidly positioned within the sleeve, a signal lamp detachably positioned in one end of the sleeve and in contact with the core of said solenoid, and a magnetic switch operated by the solenoid and adapted to contact with said solenoid core and complete an electrical connection to said signal lamp.

3. A signal light adaptable for use in a vehicle signaling system, comprising a tubular holder, a solenoid mounted within the holder, a resilient contact member positioned at one end of the solenoid and within the holder, a lamp detachably secured to and closing one end of the holder with an electrode contact thereof abutting said resilient member, an armature positioned within the tube at the opposite end of the solenoid, a switch adapted to be closed upon the energizing of the armature by said solenoid, and a cap member engaging one end of the tubular member and enclosing said lamp whereby the illuminating effect of the lamp is diminished.

In testimony whereof, we hereunto affix our signatures.

DOUGLAS S. RATLIFF.
JOHN M. FRANCIS.
THOMAS E. REESE.